June 2, 1970 A. W. KANT 3,515,222
CABLE PLOW MOUNTING
Filed June 19, 1968 2 Sheets-Sheet 1

INVENTOR.
ALVIN W. KANT
BY
Eckhoff and Hoppe
ATTORNEYS

INVENTOR.
ALVIN W. KANT
BY
Eckhoff and Hoppe
ATTORNEYS

United States Patent Office 3,515,222
Patented June 2, 1970

3,515,222
CABLE PLOW MOUNTING
Alvin W. Kant, Oakland, Calif., assignor to American Tractor Equipment Corporation, a corporation of California
Continuation-in-part of application Ser. No. 579,358, Sept. 14, 1966. This application June 19, 1968, Ser. No. 738,351
Int. Cl. A01b *63/00, 65/00*
U.S. Cl. 172—484          5 Claims

ABSTRACT OF THE DISCLOSURE

A cable plow mounting for supporting a plow from a ground engaging vehicle, comprising a first support that may be raised and lowered relative to said vehicle, a second support pivotally mounted from the first and movable between positions to the left and right of a center position, actuating means for pivoting said first support, a bracket mounted from said second support for relatively free pivotal movement upon a vertical axis, and a plow shank pivotally mounted upon a horizontal axis from said bracket; whereby said plow shank may be selectively offset to the right or left of center while maintaining positions of parallel alignment and/or selectively positioned to adjust the fleet angle of the plow or its vertical relationship to the ground.

---

This invention relates generally to cable laying devices especially those of the type that may be carried and drawn by a prime mover to plow a deep furrow in the ground and simultaneously lay a cable therein.

This application is a continuation-in-part of applicant's copending application Ser. No. 579,358, filed Sept. 14, 1966, now U.S. Pat. No. 3,403,521.

At the present time, the use of cable plows for the burying of electrical, telephone and similar cables has largely supplanted the trenchers and back fillers which were formerly used. The present invention relates to an improved form of cable plow mounting.

In accordance with the present invention, a cable plow is provided wherein the shank is free to pivot, thus keeping the plow always pointed in the direction of travel. By allowing the shank to pivot freely, the power requirements of the towing vehicle are reduced as well as the steering and braking effort.

In accordance with another aspect of the invention, a pitch adjusting means is provided on the shank which permits control of the fleet angle between the plow and the cable, thereby preventing sharp bends and tension on the cable. This is particularly important when the cable is being laid in rough terrain.

Another aspect of the present invention involves providing an offset cable-laying device of the type described above which can be used to lay cables adjacent to a property line, building, fence or the like.

A further aspect of the present invention is to provide a readily detachable cable laying device which does not interfere with the use of the towing vehicle for other purposes.

A still further feature and object of this invention is to provide a cable plow and mounting assembly therefor and having each of the features described above and further including a parallelogram linkage to allow vertical movement of the plow while maintaining the shank in a generally upright position.

Other features and objects of the invention will become apparent in view of the following detailed description and the accompanying drawings.

In the drawings forming a part of this application and in which like parts are identified by like reference numerals throughout the same, FIG. 1 is an embodiment of the present invention which is particularly adapted for use with crawler-type vehicles and wherein the cable is to be laid either in the path of the vehicle or slightly offset therefrom;

Figure 1:
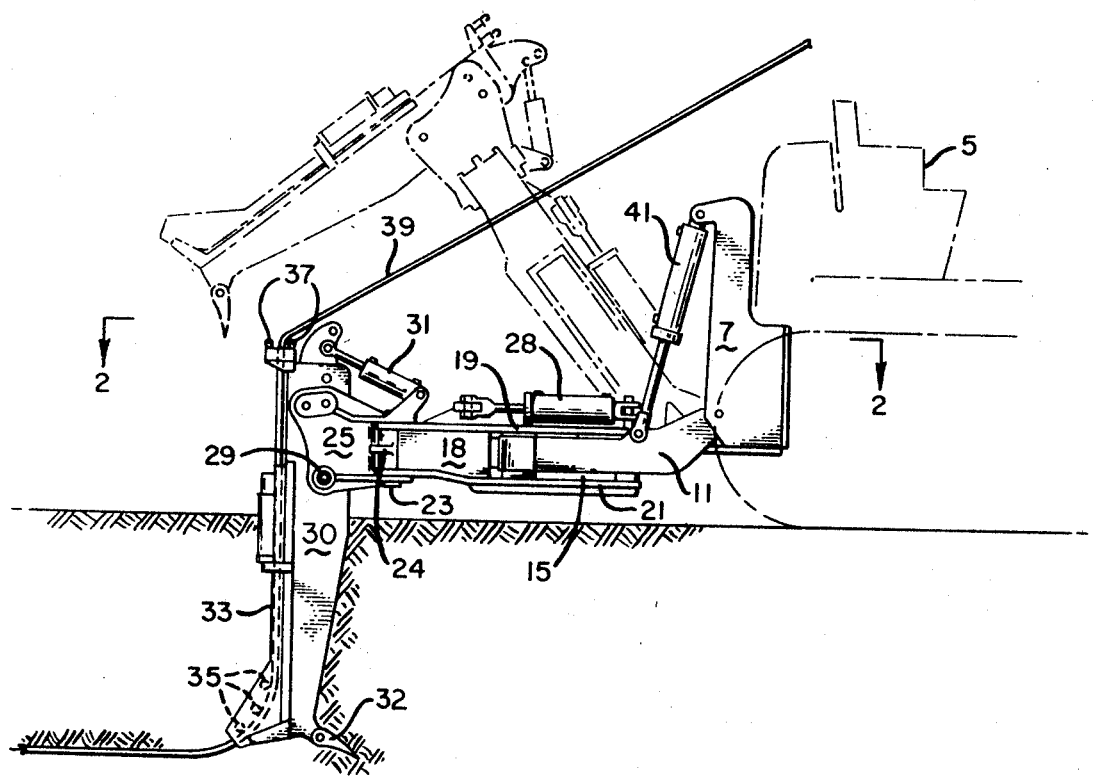
Figure 2:
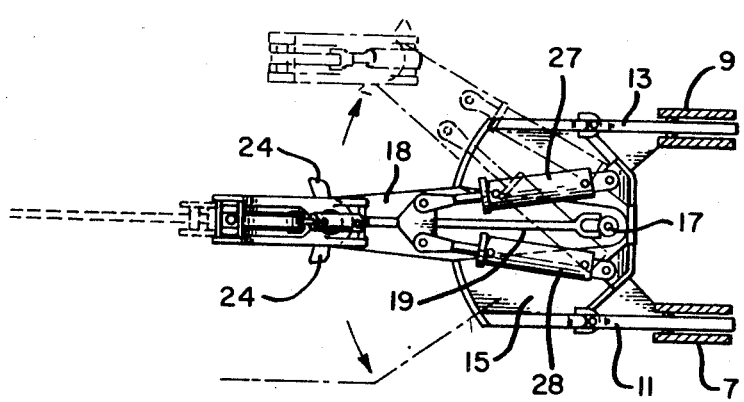
FIG. 2 is a plan view on the lines 2—2 of FIG. 1.
Figure 3:
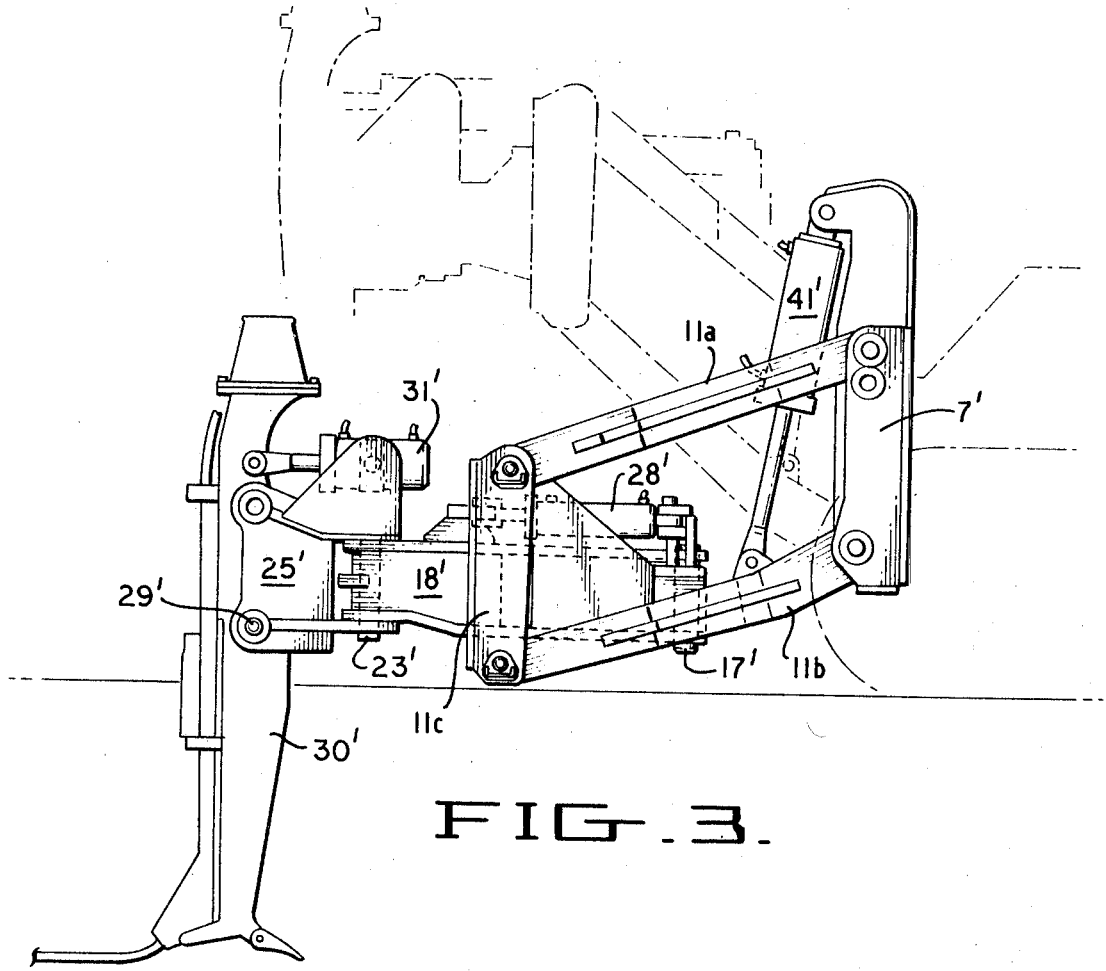
FIG. 3 is a second embodiment of the invention illustrating a support including a parallel linkage that allows the plow to be elevated and lowered while maintaining it in generally upright position.
Figure 4:
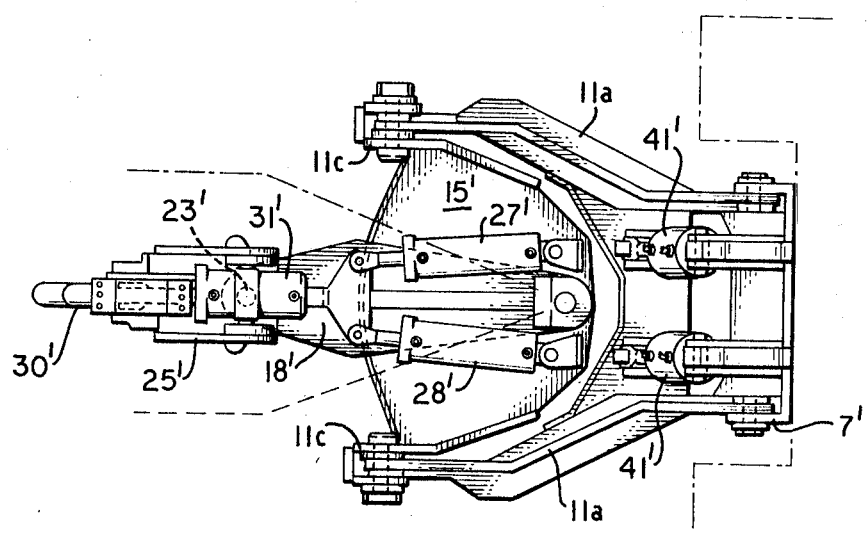
FIG. 4 is a plan view of the embodiment shown in FIG. 3.

Referring now to the drawings by reference characters, and particularly to FIGS. 1 and 2, there is shown in phantom a suitable ground engaging vehicle 5 of the crawler type. Mounted on the rear of the vehicle are a pair of brackets 7 and 9 with arms 11 and 13 pivoted thereon. Arms 11 and 13 support a frame member 15, or first support. On the forward part of frame 15 is the pivot pin 17 to which is pivoted a second support comprising an upper yoke arm 19 and a lower yoke arm 21. Arms 19 and 21 overlie frame 15 and are joined at one end to form yoke 18. At the rear of yoke 18 is a pivot pin 23 to which the shank mounting bracket 25 is pivoted. At least one hydraulic cylinder is connected between frame member 15 and yoke 18 to move the yoke from side to side, as is shown in phantom in FIG. 2. Preferably two cylinders, namely 27 and 28 are employed for this purpose. Bracket 25 is free to pivot on the pivot 23 through an angle of movement between 20–90°. Stops 24 are provided on yoke 18 and these are engaged by the sides of bracket 25 to restrict the angle of pivot.

The shank 30 of a cable plow is pivoted at point 29 to the bracket 25 while hydraulic cylinder 31 is provided which is attached between the front end of bracket 25 and the top of the shank. This permits an adjustment of the angle which the shank makes with the ground and, thus, controls the fleet angle.

The shank itself includes a replaceable tooth 32 of conventional design, and a cable tube 33 is provided, at the rear of shank 30. Bottom guide rollers 35 are employed so that the cable is paid out smoothly while top guide rollers 37 prevent binding at the top of the cable tube. Thus, a cable 39 may be passed between rollers 37, down the protective tube 33, over the rollers 35 and deposited in the ground. Hydraulic cylinders 41 are connected between the brackets 7 and 9 and the arms 11 and 13 so that the whole assembly can be raised for transportation as shown in phantom in FIG. 1.

In soft soil of moderate depth, the operation can be completed with a single pass. However, at greater depths and in hard ground, a prebreaker plow may be employed in front of the cable-laying plow.

Referring now to FIGS. 3 through 6, there is shown a second embodiment of this invention. This embodiment incorporates many of the same details and structural features of the first described device, the essential difference residing in the use of a parallelogram linkage support. More particularly, a cable plow having a shank 30' is pivoted to a mounting bracket 25' on a horizontal axis 29'. The upper end of the plow shank is inter-connected with an ear on mounting bracket 25' by an actuating cylinder 31', said cylinder being adapted for pivoting the shank through small angles upon the horizontal axis 29'.

Mounting bracket 25' is supported from and pivotally mounted upon a vertical axis to a yoke 18' by pin 23'. Yoke 18' is in turn, pivoted from a platform 15' by a pin 17', said platform being supported by laterally spaced parallelogram linkages. Each linkage comprises a pair of upper and lower parallel arms 11a and 11b, respectively, each pair of arms being pivotally connected to a bracket 7' and a connecting link 11c. Platform 15' is more particularly mounted between links 11c of each linkage and therefore it maintains essentially the same position relative to the horizontal while being moved vertically with the supporting linkages.

A pair of cylinders 27' and 28' are pivotally connected intermediate the forward side of platform 15' and the yoke 18', the combined operation of the cylinders producing a lateral shift in position of yoke 18' and the supported cable plow. Such positioning is indicated by broken lines in FIG. 4.

A pair of cylinders 41' are also provided for supporting the entire assembly. These cylinders are pivotally connected intermediate bracket 7' and the lower parallel arms 11b, respectively.

In operation, both embodiments of the invention shown provide mountings that enable a cable plow to be selectively positioned to right or left of center while maintaining the plow in substantial alignment with the direction in which the towing vehicle is moved. In addition, each mounting affords means whereby the fleet angle of the plow may be adjusted to accommodate various depths of plowing. It will be further evident that each mounting allows the depth of plowing to be adjusted without affecting the operation of the other parts. Alternatively, the cable plow may be entirely removed from the ground as shown in phantom in FIG. 3.

Although preferred embodiments of the invention have been illustrated and described, various modifications and changes may be made without departing from the spirit of the invention and each of such changes and modification is contemplated.

What I claim is:

1. An earth engaging plow for forming a furrow below the surface of the ground, into which furrow cable is directed as the plow is moved through the ground, which plow is powered by a prime mover, which plow comprises:
   (a) a pair of mounting brackets adapted to be connected to the rear of a prime mover;
   (b) a pair of support arms each pivotally supported on a mounting bracket about a first, horizontal axis;
   (c) support means mounted on the arms for pivotal movement therewith, said support means including means for pivotal movement of a portion thereof about a second, vertical axis;
   (d) a plow shank pivotally mounted to said support means for free pivotal movement about a third, vertical axis with respect to said support means; and
   (e) control means operatively connected to each of said support arms and said support means for controlling said pivotal movements of said support arms and said support means.

2. An earth engaging plow as in claim 1, and further comprising:
   (a) means for pivoting said plow shank about a horizontal axis with respect to said support means independently of movement of said support means.

3. An earth engaging plow as in claim 1, and further comprising:
   (a) stop means mounted to said plow shank and engageable with said support means for limiting the relative free pivotal movement therebetween.

4. An earth engaging plow for forming a furrow below the surface of the ground, into which furrow cable is directed as the plow is moved through the ground, which plow is powered by a prime mover, which plow comprises:
   (a) a pair of mounting brackets adapted to be connected to the rear end of a prime mover;
   (b) a pair of arms each pivoted about a horizontal axis on a mounting bracket;
   (c) a first support member mounted on the arms;
   (d) a hydraulic cylinder and piston device operatively connected between each bracket and an arm for moving the arms pivotally with respect to the prime mover;
   (e) a second support member;
   (f) a vertical pivot pin mounting the second support member on the first support member;
   (g) a bracket pivotally mounted on the second support member for pivotal movement about a vertical axis with respect to the second support member;
   (h) a hydraulic cylinder and piston operatively connected between the bracket and a plow shank pivotally supported by said bracket for pivotally moving the plow shank about a horizontal axis with respect to the bracket and second support member;
   (i) and at least one hydraulic cylinder and piston device mounted between the first support member and the second support member for moving the second support members about the vertical pivot pin.

5. An earth engaging plow as in claim 4, and further comprising:
   (a) a parallelogram linkage interconnecting said first support with a towing vehicle, and means for actuating said linkage to raise and lower the supported plow.

References Cited

UNITED STATES PATENTS

| | | | |
|---|---|---|---|
| 3,060,696 | 10/1962 | Lang | 172—484 |
| 3,175,368 | 3/1965 | Tibbitts | 61—72.6 |
| 3,348,383 | 10/1967 | Kelley | 61—72.6 |

ROBERT E. BAGWILL, Primary Examiner

S. C. PELLEGRINO, Assistant Examiner

U.S. Cl. X.R.

61—72.6; 172—666, 667